(12) United States Patent
Weston et al.

(10) Patent No.: US 11,988,517 B2
(45) Date of Patent: May 21, 2024

(54) VEHICLE SYSTEM FOR ADAPTIVE ENERGY CONSUMPTION PREDICTION

(71) Applicant: FORD GLOBAL TECHNOLOGIES, LLC, Dearborn, MI (US)

(72) Inventors: Keith Weston, Canton, MI (US); Brendan F. Diamond, Grosse Pointe, MI (US); Andrew Denis Lewandowski, Sterling Heights, MI (US); Jordan Barrett, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 17/481,773

(22) Filed: Sep. 22, 2021

(65) Prior Publication Data
US 2023/0085950 A1   Mar. 23, 2023

(51) Int. Cl.
| | |
|---|---|
| *G01C 21/34* | (2006.01) |
| *B60W 10/06* | (2006.01) |
| *B60W 50/14* | (2020.01) |
| *G01C 21/00* | (2006.01) |
| *H04W 4/46* | (2018.01) |

(52) U.S. Cl.
CPC ......... *G01C 21/3469* (2013.01); *B60W 10/06* (2013.01); *B60W 50/14* (2013.01); *G01C 21/3859* (2020.08); *H04W 4/46* (2018.02); *B60W 2530/10* (2013.01); *B60W 2530/209* (2020.02); *B60W 2556/65* (2020.02); *B60W 2710/0666* (2013.01)

(58) Field of Classification Search
CPC .......... G01C 21/3469; G01C 21/3859; B60W 10/06; B60W 50/14; B60W 2530/10; B60W 2530/209; B60W 2556/65; B60W 2710/0666; B60W 40/10; H04W 4/46
See application file for complete search history.

(56) References Cited

U.S. PATENT DOCUMENTS

| | | | |
|---|---|---|---|
| 9,037,327 | B2 | 5/2015 | Kim |
| 9,346,452 | B2 | 5/2016 | Qiu et al. |
| 9,630,504 | B2 | 4/2017 | Tseng et al. |
| 10,157,510 | B2 | 12/2018 | Meyer et al. |
| 10,415,986 | B2 | 9/2019 | Meyer et al. |
| 2011/0251782 | A1 | 10/2011 | Perkins et al. |
| 2017/0038222 | A1* | 2/2017 | Meyer ................ B60L 58/12 |
| 2018/0029500 | A1* | 2/2018 | Katanoda .......... G01C 21/3697 |
| 2020/0294323 | A1 | 9/2020 | Zeng et al. |

* cited by examiner

*Primary Examiner* — Brian P Sweeney
(74) *Attorney, Agent, or Firm* — Joseph Zane; Brooks Kushman P.C.

(57) ABSTRACT

A vehicle includes one or more transceivers configured to communicate with a server; and a controller programmed to responsive to detecting an extra load to the vehicle, obtain a first candidate energy consumption rate corresponding to the extra load from the server, calculate an estimated energy consumption rate using the first candidate energy consumption rate, and calculate a distance to empty using the estimated energy consumption rate.

6 Claims, 2 Drawing Sheets

VEHICLE SYSTEM FOR ADAPTIVE ENERGY CONSUMPTION PREDICTION

TECHNICAL FIELD

The present disclosure generally relates to a system for predicting energy consumption for a vehicle. More specifically, the present disclosure relates to a system for predicting energy consumption in a variety of driving conditions.

BACKGROUND

Fuel consumption rates for a vehicle may vary dramatically in different driving conditions. A sport car may consume significantly more fuel during track use and other high performance driving events than under the normal driving condition. Fuel consumption for a truck may vary under different load conditions. The varying fuel consumption rate may result in inaccurate distance to empty calculation.

SUMMARY

In one or more exemplary embodiments of the present disclosure, a vehicle includes one or more transceivers configured to communicate with a server; and a controller programmed to responsive to detecting an extra load to the vehicle, obtain a first candidate energy consumption rate corresponding to the extra load from the server, calculate an estimated energy consumption rate using the first candidate energy consumption rate, and calculate a distance to empty using the estimated energy consumption rate.

In one or more exemplary embodiments of the present disclosure, a method for a vehicle includes responsive to planning a route, dividing the route into a first section associated a first speed limit and a second section associated with a second speed limit; obtaining, from a server, a first energy consumption rate corresponding to the first section; and estimating a distance to empty using the first energy consumption rate.

In one or more exemplary embodiments of the present disclosure, a vehicle includes one or more transceivers configured to communicate with a server via a remote connection and a fleet vehicle via a direct connection; and a controller programmed to responsive to detecting a first event associated with an increased energy consumption rate compared with a current energy consumption rate, obtain a first candidate energy consumption rate corresponding to the first event from the fleet vehicle, calculate an estimated energy consumption rate using the first candidate energy consumption rate, and calculate a distance to empty using the estimated energy consumption rate.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle system for measuring and predicting the vehicle energy consumption rate. More specifically, the present disclosure proposes a vehicle system for more accurately predicting the vehicle energy consumption rate using crowd-sourced information shared between multiple fleet vehicles.

Figure 1:
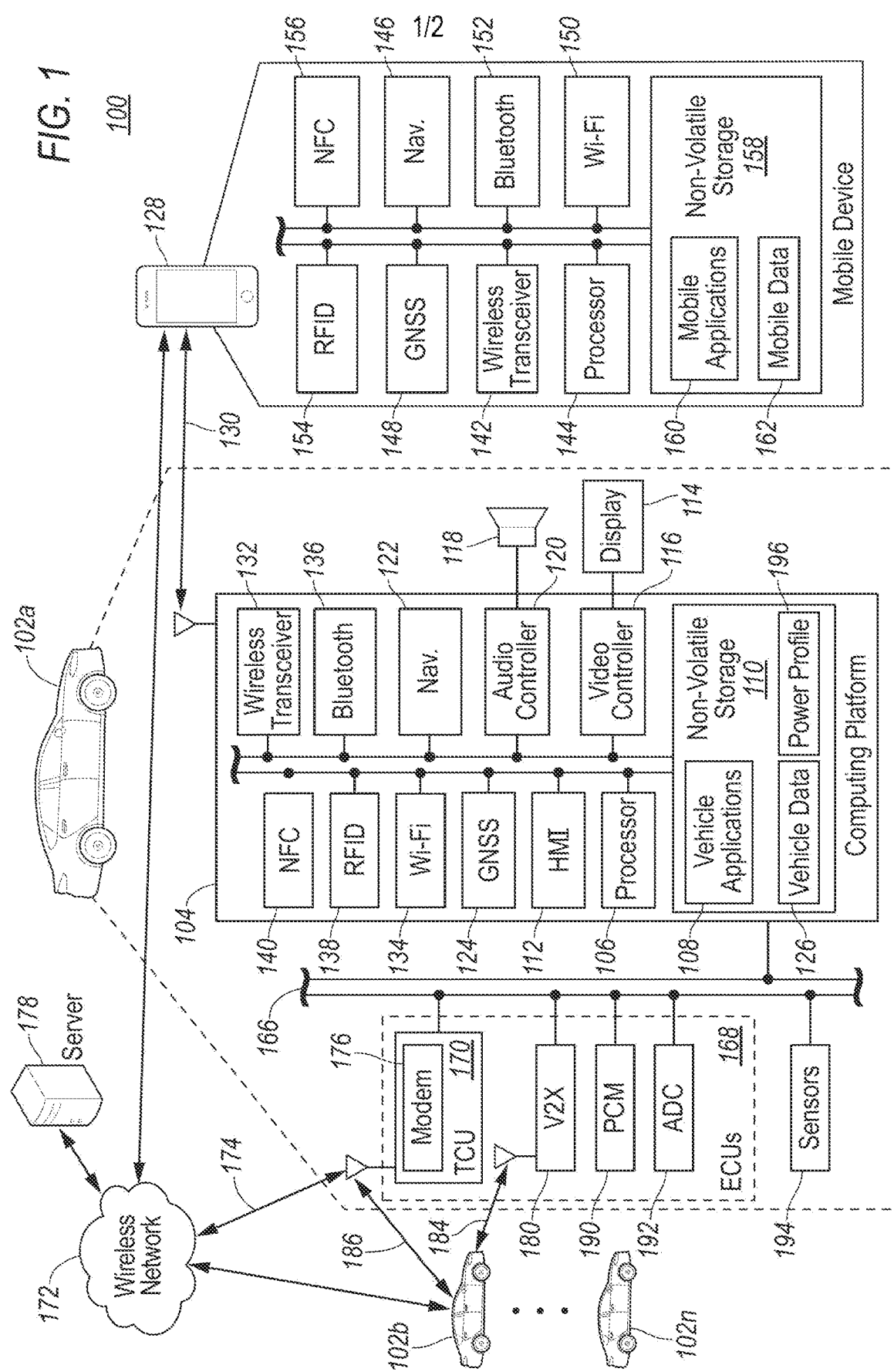
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Michigan. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, remote controls, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The computing platform 104 may be provided with various features allowing the vehicle occupants/users to interface with the computing platform 104. For example, the computing platform 104 may receive input from human machine interface (HMI) controls 112 configured to provide for occupant interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smart fobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, an ultra-wide band (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via Bluetooth low-energy (BLE), Wi-Fi, UWB, or the like.

The computing platform 104 may be configured to communicate with various electronic control units (ECUs) 168 of the vehicle 102 configured to perform various operations. For instance, the computing platform 104 may be configured to communicate with a telematics control unit (TCU) 170 configured to control telecommunication between vehicle 102 and a wireless network 172 through a wireless connection 174 using a modem 176. The wireless connection 174 may be in the form of various communication network e.g., a cellular network. Through the wireless network 172, the vehicle may access one or more servers 178 to access various content for various purposes. It is noted that the terms wireless network and server are used as general terms in the present disclosure and may include any computing network involving carriers, router, computers, controllers, circuitry or the like configured to store data and perform data processing functions and facilitate communication between various entities.

The ECUs 168 may further include a vehicle-to-everything (V2X) controller 180 configured to directly communicate with one or more fleet vehicles 102b to 102n via a wireless vehicle-to-vehicle (V2V) or V2X connection. For instance, the V2X controller 180 may be configured to support dedicated short-range communication (DSRC) and/or cellular vehicle-to-everything (CV2X) connections to communicate with the fleet vehicle 102b to 102b via V2V connection 184. The fleet vehicle 102b may include various vehicles associated with the same or different manufacturers and subscribed to the data sharing feature enabled by the vehicles system of the present disclosure. Additionally or alternatively, the TCU 170 may be configured to support the V2X communications (e.g. CV2X) to communicate with the fleet vehicle 102b to 102n via a V2X connection 186. Additionally or alternatively, the vehicle 102a may be configured to indirectly share data with the fleet vehicles 102b to 102n via the server 178 through the wireless network 172. Data from the fleet vehicles 102b to 102n may be uploaded and stored in the server 178 and the vehicle 102a may download the data from the server 178.

The ECUs 168 may further include a powertrain control module (PCM) 190 configured to perform various control and operations of the powertrain of the vehicle 102a. The ECUs 168 may further include an autonomous driving controller (ADC) 192 configured to provide autonomous driving features to the vehicle 102a. It is noted that the ECUs 168 introduced here are merely examples and the actual vehicle 102a may be provided with more ECUs or controllers configured to perform various operations. Each ECU 168 may be provided with processing and storage capabilities operated by computer software. The vehicle 102a may be further provided one or more sensors 194 configured to provide various measurement data to the ECUs 168 and the computing platform 104. As a few non-limiting examples, the sensors 194 may include a temperature sensor configured to measure an ambient temperature of the vehicle 102a. The sensors 194 may further include one or more vehicle weight/load sensors configured to measure the weight/load of the vehicle 102a. The one or more weight sensors may be installed at the suspension system of the vehicle as an example. The sensors 194 may further include one or more gyroscopes or acceleration sensors configured to measure acceleration and deceleration parameters to allow the computing platform 104 or the ECUs 168 to calculate the vehicle load based on the acceleration and deceleration of the vehicle 102a. For instance, the acceleration and deceleration behavior of the vehicle 102a may change when the vehicle is loaded or towing a trailer. By analyzing those behaviors as measured by the sensor 194, the computing platform 104 may determine the loading and towing status of the vehicle 102a.

Power and energy consumption characteristics for the vehicle 102a may vary significantly by different driving conditions. For instance, the energy consumption rate may increase when the vehicle 102a is loaded or performing aggressive driving operations (e.g. race track). Additionally, the maximum power and torque output may also depend on operating conditions such as the ambient temperature or the like. The driving conditions triggering the power consumption and torque variations may be referred to as an event in the present disclosure. The PCM 184 of the vehicle 102a may be configured to automatically adapt to a plurality of events using the default computing program. As an example, responsive to detecting a load or trailer (i.e. an event), the vehicle 102a may calculate the energy consumption rate and the maximum output torque based on the weight of the load or trailer and further estimate the distance to empty (DTE) of the vehicle 102a such that the vehicle user may make fueling arrangements in advance. The energy consumption and torque output information corresponding to the event may be stored in the vehicle 102a as a power profile 196. As illustrated in FIG. 1, the power profile 196 may be stored in the storage 110. To more accurately determine the power profile 196 corresponding to a given event, the system may be configured to allow the power profiles 196 to be shared between multiple vehicles. For instance, responsive to detecting an event the vehicle 102a may obtain one or more corresponding power profiles already determined by the one or more fleet vehicles 102b to 102n. Since the power profiles 196 from the fleet vehicles 102b to 102n are determined based on measured data rather than estimation, those power profiles 196 may be more accurate in general.

Figure 2:
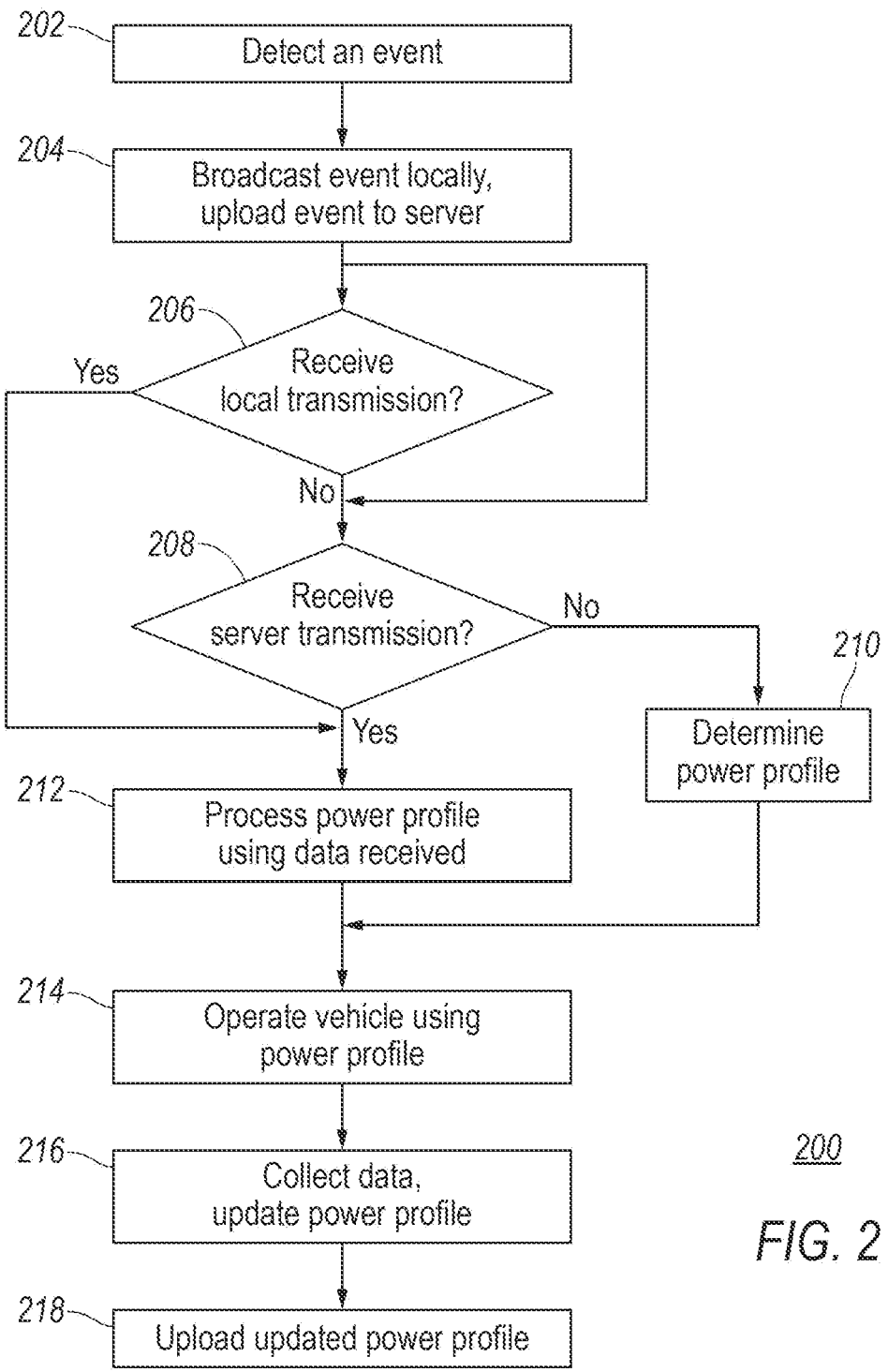
FIG. 2 illustrates an example flow diagram of process for determining a power profile of one embodiment of the present disclosure.

Referring to FIG. 2, an example flow diagram of a process 200 for determining a power profile 196 for a vehicle 102a is illustrated. With continuing reference to FIG. 1, responsive to detecting an event at operation 202, the vehicle 102a broadcasts the event to one or more local fleet vehicles 102b to 102n via the V2X controller. In addition, the vehicle 102a upload the event to the server 178 and request for a candidate power profile 196 corresponding to the event as detected. The vehicle 102a may further transmit vehicle information such as vehicle model year, powertrain information or the like both locally to the fleet vehicles 102b to 102n and remotely to the server 178 to facilitate finding the candidate corresponding power profile 196. The vehicle 102a verifies if any candidate power profile 196 is received from fleet vehicles 102b to 102n via a local transmission and/or from the server 178 via a remote transmission at operations 206 and 208. If no candidate power profile 196 is received, the process 200 proceeds to operation 210 and the vehicle 102a determines a standalone power profile based on the parameters of the event. Otherwise, if one or more candidate power profile 196 has been receive via the local transmission and/or the remote transmission, the process 200 proceeds to operation 212 and the computing platform 104 processes the candidate power profiles 196 and determine an appropriate power profile 196 for the present event. If one of the candidate power profiles fully matches the current event as detected by the vehicle 102a, the computing platform 104 may directly use the matching candidate power profile 196 without any modifications. However, if none of the candidate power profiles received fully matches the current event, i.e., the current event only partially matches with a candidate event corresponding to the candidate power profile 196, the computing platform 104 may select one power profile 196 that is the closest to the current event and modify the parameters based on the difference between the current event and candidate event. Alternatively, the computing platform 104 may determine the appropriate power profile 196 by interpolating the plurality of candidate power profiles as received. Having the power profile 196 determined, the PCM 184 operates the vehicle 102a using the power profile 196 at operation 214. At operation 216, the vehicle 102a collects data and updates the current proper profile to reflect any deviations between the measured power profile data and the determined power profile 196. At operation 218, the vehicle 102a uploads the updated power profile 196 to the server 178 to contribute to the system.

The operations of the process 200 may be applied to various situations. The following description introduces a few non-limiting examples for those situations. The events detected by the vehicle 102a may include various situations in which the power profile 196 of the vehicle 102a may be affected. For instance, the events may include a load event indicative of towing or loading estimate above a predefined load threshold (e.g. 1,000 lbs for a truck). The weight of the load or trailer may be measured by one or more sensors 194. Additionally or alternatively, the weight may be manually input into the computing platform 104 by the user via the HMI controls 112. In an alternative example, the event may include a geofence event defined by a current and/or predicted vehicle location form the GNSS controller 124 and the navigation controller 122. The vehicle power profile 196 may vary significantly by the geofence locations. For instance, the vehicle energy consumption rate will be significantly higher when the vehicle is driven on a track than on a public road. The geofences may include a plurality of categories including race track, highway, farm, sand, off road, hilly road, traffic or the like. Responsive to planning a route via the navigation controller 122, the computing platform 104 may divide the route input a plurality sections each corresponding to a geofence event. In an alternative example, the event may include an external information event indicative of a driving condition caused by external sources such as wind speed/direction and temperature that may affect the power profile 196. For instance, cold ambient temperature may indicate additional energy consumption due to increase heater usage and increased parasitic losses. Headwind may indicate additional wind resistance. As an alternative example, the vehicle 102a may receive a delivery task to pick up and drop off locations for a load having a specific weight. The computing platform 104 may plan a delivery route accordingly based on the information of the task and information about the route from the external sources. In this case, the vehicle 102a may detect multiple events including a load event, a geofence event and an external information event.

Responsive to detecting the event, the vehicle 102a may attempt to obtain the corresponding power profile 196 both locally from one or more fleet vehicles 102b to 102n and the server 178. A local fleet vehicle 102b, after receiving the broadcast from the vehicle 102a, may determine if a corresponding power profile 196 is locally available. If the answer is a yes, the fleet vehicle 102b may send the corresponding power profile 196 to the vehicle 102 via the V2V connections 180 and/or 186. Alternatively, the fleet vehicle 102b may first ask for a user permission before being allowed to transmit the power provide to the vehicle 102a. Similarly, the server 178 may analyze the event received from the vehicle 102a and look for a candidate power profile 196 corresponding to the event in a database. Here, the candidate power profile 196 may correspond to the event when an exact match is found. In other words, the server 178 and/or the fleet vehicle 102b found a power provide that fully match the event. An event may be associated with multiple factors. As an example, the present event may be associated with a vehicle weight, a vehicle model, and an ambient temperature. In this case, the exact match may be found when the existing power profile 196 corresponds to all of the vehicle weight, motor model, and the ambient temperature being the same or within a tolerable threshold. Alternatively, the candidate power profile 196 may still correspond to the event when a partial match is found indicative of at least one factor in the event is matched. Continuing with the above example, a partial match may be found when only vehicle model and ambient temperature match but the difference for the vehicle weight is about the threshold. The partial matching candidate power profile 196 may still be helpful to allow the vehicle 102a to determine the correct power profile 196 for the current event. Continuing with the above example, if the energy consumption rate for the vehicle 102a is 400 Wh/mile when not loaded and the candidate power profile 196 indicates a 450 Wh/mile energy consumption rate when the vehicle 102a is loaded with 2,000 lbs weight, the computing platform 104 may linearly interpret the power consumptions under those conditions and determine the energy consumption rate for a current load weight of 1,000 lbs to be around 425 Wh/mile. Based on the energy consumption rate, the computing platform 104 may estimate a DTE and output the estimated DTE to the user via the HMI controls 112. In addition, the power profile 196 may further include a maximum power and torque output corresponding to the event to allow the PCM 190 to operate the vehicle accordingly during the event. Knowing the maximum power and torque output may be particularly helpful when the vehicle 102a is operated autonomously using the ADC 192. Additionally, the computing platform 104 may be further configured to automatically make fueling arrangements based on the estimated DTE. For instance, responsive to an increased energy consumption rate, the navigation controller 122 may add a fueling stop on the planned route.

As the vehicle 102a traverses on the route, the computing platform 104 may adjust and switch between different power profiles by interpolating the profiles responsive to encountering different events. For instance, if the vehicle is currently driving at 55 mph is approaching a next geofence event having the speed limit of 70 mph, the computing platform 104 may adjust the power profile by increase the energy consumption rate due to the increased wind resistance due to higher vehicle speed. Actual energy consumption rates may be measured by the vehicle 102a as vehicle traverses the route to further improve and update the power profile 196 for the vehicle 102a as well as other fleet vehicle 102b to 102n. The updated power profile 196 may be shared to one or more fleet vehicles 102b to 102n and/or uploaded to the server 178.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   one or more transceivers configured to communicate with a server via a remote connection and a fleet vehicle via a direct connection;
   one or more sensors; and
   one or more controllers programmed to:
      responsive to detecting, via the one or more sensors, a first event associated with an increased energy consumption rate compared with a current energy consumption rate, obtain a first candidate energy consumption rate corresponding to the first event from the fleet vehicle,
      calculate an estimated energy consumption rate using the first candidate energy consumption rate,
      calculate a distance to empty using the estimated energy consumption rate,
      obtain a first maximum torque corresponding to the first event, and
      operate the vehicle within the first maximum torque.

2. The vehicle of claim 1, wherein the first event includes: an increased vehicle load, and a speed limit change.

3. The vehicle of claim 2, wherein the first event further includes: an ambient temperature change, and a road condition change.

4. The vehicle of claim 1, wherein the one or more controllers are further programed to:
   responsive to detecting a second event associated with another increased energy consumption rate compared with a current energy consumption rate, obtain a second candidate energy consumption rate corresponding to the second event from the fleet vehicle.

5. The vehicle of claim 4, wherein the one or more controllers are further programmed to:
   interpolate between the increased energy consumption rate and the other increased energy consumption rate to determine a transitional energy consumption rate.

6. The vehicle of claim 1, wherein the one or more controllers are further programmed to:
   measure an actual energy consumption rate as the vehicle drives during the first event; and
   upload the actual energy consumption rate to the server.

* * * * *